United States Patent
Louviot et al.

(10) Patent No.: US 11,114,233 B2
(45) Date of Patent: Sep. 7, 2021

(54) AC/DC CONVERTER

(71) Applicant: THALES, Courbevoie (FR)

(72) Inventors: Rémi Louviot, Chatou (FR); Rémy Biaujaud, Chatou (FR); Jean-Marc Bouffay, Chatou (FR); Philippe Dumont, Chatou (FR); Eric Touzet, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/700,934

(22) Filed: Dec. 2, 2019

(65) Prior Publication Data
US 2020/0176179 A1 Jun. 4, 2020

(30) Foreign Application Priority Data

Dec. 4, 2018 (FR) ...................................... 1872279

(51) Int. Cl.
*H01F 27/30* (2006.01)
*H01F 27/26* (2006.01)
*H01F 41/06* (2016.01)
*H02M 7/00* (2006.01)
*H02M 7/06* (2006.01)

(52) U.S. Cl.
CPC ......... *H01F 27/306* (2013.01); *H01F 27/263* (2013.01); *H01F 41/06* (2013.01); *H02M 7/003* (2013.01); *H02M 7/06* (2013.01)

(58) Field of Classification Search
CPC ...... H01F 27/306; H01F 27/263; H01F 41/06; H01F 27/324; H02M 7/003; H02M 7/06; H02M 1/12
See application file for complete search history.

(56) References Cited

U.S. PATENT DOCUMENTS

| | | | | |
|---|---|---|---|---|
| 1,992,814 A | * | 2/1935 | Cooney | H01F 27/324 336/198 |
| 2009/0068306 A1 | * | 3/2009 | Jaderberg | B29C 33/04 425/547 |
| 2014/0266537 A1 | | 9/2014 | Bichler | |
| 2016/0134211 A1 | * | 5/2016 | Rollin | H02M 1/12 318/400.3 |
| 2018/0122551 A1 | | 5/2018 | Yoshikawa | |

FOREIGN PATENT DOCUMENTS

| | | |
|---|---|---|
| DE | 10 2013 216 585 A1 | 2/2015 |
| FR | 3 047 852 A1 | 8/2017 |
| WO | 2010/067414 A1 | 6/2010 |
| WO | 2017/217601 A1 | 12/2017 |

* cited by examiner

*Primary Examiner* — Peter M Novak
(74) *Attorney, Agent, or Firm* — BakerHostetler

(57) ABSTRACT

An AC/DC converter comprising a set of two rectifying bridges, each rectifying bridge comprising a first output connected to an output terminal of the AC/DC converter by an interphase inductor. The interphase inductor may comprise a magnetic circuit comprising two branches that are substantially parallel and two windings, each winding being wound about one branch selected from the two branches. Each winding may be held away from the magnetic circuit, at every point of the winding, by means of a set of at least one holding block made of a material having an A-scale Shore hardness lower than or equal to 50 and being distant at every point from the branches.

8 Claims, 7 Drawing Sheets

AC/DC CONVERTER

CROSS-REFERENCE TO RELATED APPLICATIONS

This application claims priority to foreign French patent application No. FR 1872279, filed on Dec. 4, 2018, the disclosure of which is incorporated by reference in its entirety.

FIELD OF THE INVENTION

The invention relates to the field of AC/DC converters of the type comprising a transformer, such as an autotransformer. The transformer may comprise comprising two three-phase secondaries connected to two three-phase rectifying bridges at least one output of which is averaged via an interphase inductor comprising two interphase coils. Each interphase coil is connected on the one hand to an output of one of the rectified bridges and on the other hand to an output terminal of the converter. The AC/DC converter delivers an output voltage of the converter between two output terminals of the converter.

The AC voltages delivered by the two three-phase secondaries of the transformer are out of phase. An interphase inductor smooths the voltage delivered as output from a rectifying bridge to which it is connected in order to decrease residual undulation.

The interphase inductor comprises at least one magnetic circuit comprising two branches and two electrically conductive windings, each winding being wound about one branch selected from the two branches in order to form the two interphase coils. The magnetic circuit and the windings are conventionally held together by a protective varnish, in which they are all embedded. The inductors are mechanically and electrically connected to the two rectifying bridges and to an output terminal of the AC/DC converter via the windings. The varnish has the advantage of performing a dual function in that it not only holds the windings together but also protects them from environmental conditions (corrosion) and shocks that may occur during the handling of the interphase inductor and in particular when it is mechanically and electrically connected to the rectifying bridges and to the output of the AC/DC converter.

This type of AC/DC converter has on-board applications, in particular in aeronautics. However, one of the major drawbacks of this type of converter is the acoustic noise that it generates, which may be of up to 70 dB or even 80 dB, and which may greatly annoy passengers when the converter is installed in proximity to the passengers or the pilots when it is installed in proximity to the cockpit.

Specifically, operation of the AC/DC converter results in a high level of saturation of the magnetic circuit. This level of saturation, via the magnetostriction effect, is responsible for high levels of vibration of the magnetic circuit, which are transmitted, via the varnish, to the windings then, via the windings, to the other elements of the AC/DC converter and to the equipment to which the AC/DC converter is connected, which become emitters of high levels of noise at high acoustic frequencies, of the order of multiples of the frequency of the AC voltage injected as input into the AC/DC converter, which is conventionally 400 Hz (fixed frequency) or comprised between 360-800 Hz when the frequency is variable.

One solution currently used to decrease the acoustic noise of such AC/DC converters is to completely decouple, vibrationally, the block formed by the windings and the magnetic circuit embedded in the varnish from the rest of the AC/DC converter, by mechanically connecting it to the rest of the AC/DC converter by means of damping pads, and by electrically connect it to the rest of the AC/DC converter by means of electrical braids. This solution has the drawback of being expensive (cost of the pads and braids) and bulky.

The other solution is a palliative solution to the acoustic noise of common-mode self-induction that typically employs acoustic covering methods (absorption, damping, reduction of leakage). This solution has the drawback of bulk because covering solutions increase volume, and also add weight.

SUMMARY OF THE INVENTION

One aim of the invention is to limit at least one of the aforementioned drawbacks;

To this end, one subject of the invention is an AC/DC converter comprising an input of the AC/DC converter, said converter being intended to receive an input three-phase AC voltage and to convert it into a DC voltage, the AC/DC converter comprising a transformer intended to receive the input three-phase AC voltage and to deliver two output three-phase AC voltages via two respective secondaries, the converter comprising a set of two rectifying bridges, each secondary being connected to the input of one of the two rectifying bridges of the set, each rectifying bridge of the set of rectifying bridges comprising a first output connected to an output terminal of the AC/DC converter by an interphase inductor, the interphase inductor comprising a magnetic circuit comprising two branches that are substantially parallel and two windings, each winding being wound about one branch of the two branches and being held away from the magnetic circuit, at every point of the winding, by means of a set of at least one holding block made of a material having an A-scale Shore hardness lower than or equal to 50.

In other words, the windings are away, at every point, from the two branches.

Advantageously, the winding is fastened to the branch by means of the set of at least one holding block.

Advantageously, the winding is fastened to the branch solely by means of the set of at least one holding block.

Advantageously, the material is an adhesive.

The invention also relates to a process for manufacturing an AC/DC converter such as described above, comprising the following steps for each winding:
- a winding step in order to form the winding about the branch so that the winding is able to be held away from the magnetic circuit at every point of the winding,
- a step of forming the set of at least one holding block fastened to the magnetic circuit,
- a step of arranging the winding with respect to the magnetic circuit so that the set of at least one holding block holds the winding away from the magnetic circuit at every point of the winding.

Advantageously, the material is an adhesive.

In a first embodiment, the process comprises a step of positioning the winding and the magnetic circuit in a relative position in which the winding is located away from the magnetic circuit at every point of the winding, followed by a step of applying an adhesive between the winding and the branch and a step of polymerizing the adhesive so as to form the set of at least one holding block.

In a second embodiment, the process comprises a step of injecting the material into a mould that surrounds the magnetic circuit and that defines at least one free volume in which the set of at least one holding block is intended to be located, the step of injecting the material being followed by a step of removing the mould followed by the winding step

BRIEF DESCRIPTION OF THE DRAWINGS

The invention will be better understood and other advantages will become apparent on reading the detailed description of one embodiment that is given by way of example, which description is illustrated by the appended drawings, in which.

For the sake of clarity, elements that are the same have been referenced with the same references in the various figures.

DETAILED DESCRIPTION

Figure 1:
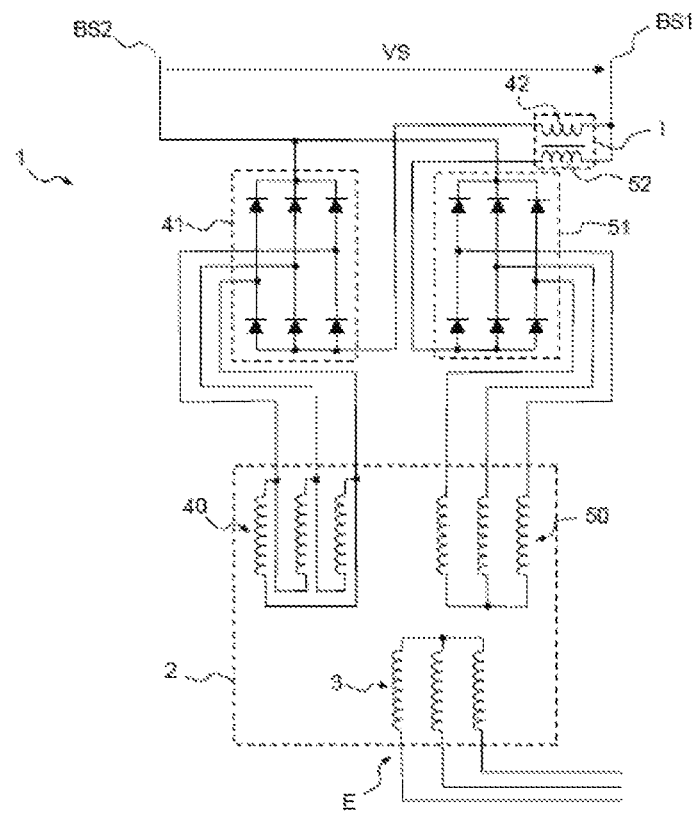
FIG. 1 shows a circuit diagram of an example of an AC/DC converter according to the invention, FIG. 2a schematically shows an example of an interphase inductor of an AC/DC converter according to the invention, FIG. 2b schematically shows in cross section a plane of symmetry of the two branches of the magnetic circuit of the interphase inductor, FIG. 2c schematically shows a side view of the inductor of FIG. 2a, seen from the point of view represented by the eye in FIG. 2b, FIG. 3 schematically shows, in a plane perpendicular to the longitudinal axis of one branch of the magnetic circuit, the volume bounding the winding wound around this branch, FIG. 4 schematically shows the noise generated by an interphase inductor of a prior-art AC/DC converter (solid line) and by an interphase inductor of an AC/DC converter according to the invention (dashed line), FIG. 5 schematically shows another example of an AC/DC converter according to the invention, FIG. 6 schematically shows the steps of a first embodiment of the process according to the invention, FIG. 7 schematically shows the steps of a second embodiment of the process according to the invention, FIG. 8 schematically shows a magnetic core equipped with adhesive blocks and obtained by implementing the process of FIG. 7, FIG. 9 schematically shows a mould used in the process of FIG. 7.

The invention relates to an AC/DC converter 1, an example of which is shown in FIG. 1, comprising an input E, said converter being intended to receive an input AC voltage and to convert it into a DC voltage VS. The AC/DC converter 1 comprises a transformer 2 the three-phase input of which is the input E of the primary 3 of the transformer 2. The transformer 2 delivers a first output AC voltage via a first three-phase secondary 40 of the transformer and a second output AC voltage via a second three-phase secondary 50 of the transformer. The AC/DC converter 1 comprises two rectifying bridges 41, 51, taking the form of diode bridges, and an interphase inductor I. Each secondary 40, 50 is connected to an input of one of the two rectifying bridges 41, 51.

Each rectifying bridge 41, 51 comprises a first output connected to the interphase inductor. The interphase inductor I is furthermore connected to an output terminal BS1 of the converter 1.

The interphase inductor I comprises two coils 42, 52. The first output of each rectifier 41, 51 is connected to one terminal of one of the coils 42, 52 of the interphase inductor I, the other terminal of the coil 42, 52 being connected to the output terminal BS1 of the converter 1.

The output voltage of the AC/DC converter is delivered across the terminal BS1 and another output terminal of the converter BS2.

In the nonlimiting example of FIG. 1, the second outputs of the two rectifying bridges are connected to the other output terminal BS2 of the converter.

Figure 2A:
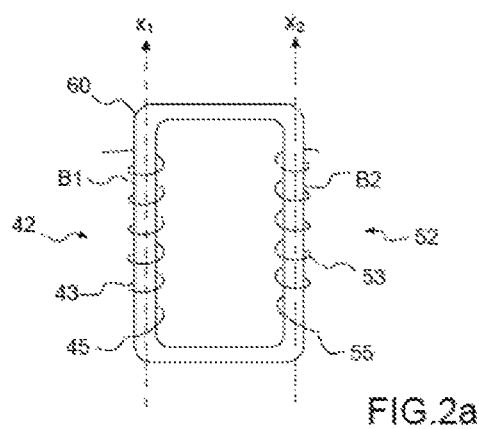

As may be seen in FIG. 2a, the interphase inductor I comprises a common magnetic core defining a common magnetic circuit 60 and conductive windings 43, 53 that are wound around this common core 60 so as to form the two coils 42 and 52.

The magnetic circuit 60 is conventionally based on a ferrite or at least one strip of a ferromagnetic material. The magnetic circuit may be of the coiled type, it then comprising at least one strip, or of the stacked type, it then comprising at least one stack of strips.

The two interphase coils are mounted in parallel and coupled to form a mutual inductance.

Each winding 43, 53 is obtained by winding a conductive elongate element 45, 55 (shown in FIG. 2a) about one branch B1, B2 of the common magnetic circuit 60.

Each conductive elongate element 45, 55 is for example made of copper or of aluminium.

The two branches B1 and B2 are parallel branches of a closed magnetic circuit 60. Each branch B1, B2 extends longitudinally along a longitudinal axis of the branch x1, x2. The axes x1 and x2 are parallel. As shown in FIG. 2a, each elongate conductive element 45, 55 is wound around its branch B1 or B2, i.e. about the longitudinal axis x1 or x2 of the branch B1, B2. The winding 43, 53 is elongate along the longitudinal axis of the corresponding branch B1 or B2. In other words, each winding 43, 53 comprises a plurality of turns that are adjacent pairwise along the axis x1 or x2.

Figure 2B:
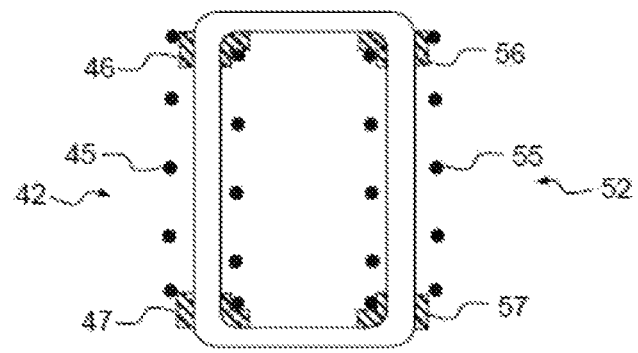

According to the invention, and as shown in FIG. 2b, the windings 43, 53 are mounted on the common magnetic circuit 60 by means of a set of at least one block 46, 47, 56, 57 of a material having an A-scale shore hardness lower than or equal to 50.

The material is for example an adhesive. The shore hardness is then the hardness of the adhesive after polymerization of the adhesive.

Advantageously, the A-scale shore hardness is comprised between 20 and 50.

The material is for example a mono-component silicone elastomer or a bi-component alkoxy silicone.

Figure 2C:
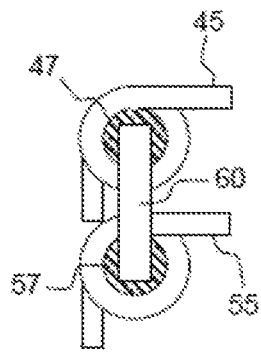

According to the invention, as shown in FIG. 2c, which shows a side view of the interphase inductor as seen from the eye shown in FIG. 2b, the winding 43, 53 is away, at every point of the winding 43, 53, from the magnetic circuit 60 and in particular from the branch B1, B2 about which it is formed. In other words, each winding 43, 53 encircles one of the branches B1 or B2 at distance from the branch, i.e. in such a way as to not be contiguous to the branch.

Figure 3:
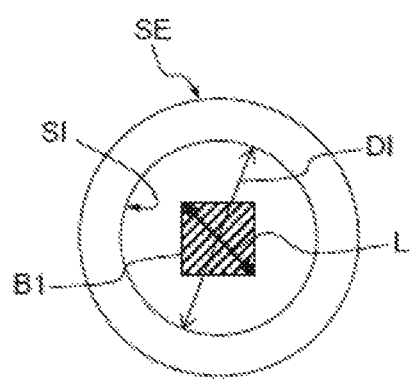

As shown in FIG. 3, each winding is bounded by a tubular volume V the axis of which is substantially parallel to or coincident with the axis of the branch about which the winding is wound. This tubular volume has an internal surface SI turned toward the branch and an external surface SE turned toward the exterior. In each plane perpendicular to the longitudinal axis of the corresponding branch B1 passing through the branch B1, the internal surface SI of the tube bounding the winding encircles the branch B1 and is, at every point, located away from the branch B1. In other words, in this plane, the diameter DI of the internal surface is larger than the maximum dimension of the branch B1 in this plane. This maximum dimension is, for example, the length L of the diagonal of the square when the branch B1 has a square external cross section or the largest diagonal in the case of a rectangular cross section or the diameter of the external cross section in the case of a round cross section.

At least one block of material of low shore hardness is interposed between each winding 43, 53 and the branch B1, B2 about which it is formed. This material is called supple material in the rest of this text.

The set of at least one block of supple material holds the winding away from the magnetic circuit at every point of the winding.

The set of at least one block of supple material also fastens the winding to the magnetic circuit.

Thus, according to the invention, a supple material is used as joining interface between the magnetic circuit and each winding. This material vibrationally decouples the magnetic circuit and each winding. In other words, this supple material allows the vibrations transmitted from the magnetic circuit (source of vibrations) to the windings (elements of high acoustic emissivity) to be filtered. This solution therefore also allows the vibrations transmitted to the rest of the converter and to the exterior of the converter to be decreased because it is via the windings that the interphase inductors are fastened. Elements that are highly emissive from an acoustic point of view are no longer caused to vibrate by the vibration of the magnetic circuit.

The interphase inductor of this solution has the advantage of being compact and of being able to be integrated into prior-art AC/DC converters without changing the layout thereof.

This solution allows the interphase inductor to still be mounted on the other elements of the AC/DC converter in the conventional way via the windings and allows the use of vibrational dampers between the windings of the interphase inductor and these other elements to be avoided. This solution allows the use of conductive braids to electrically connect the windings to the rectifiers and to the output of the AC/DC converter to be avoided. This solution is advantageous in terms of volume and cost. The magnetic circuit and each winding are in fact used as the two rigid parts of a damper.

This solution also has the advantage of not leading to changes in the electrical operation of the converter with respect to prior-art solutions.

Figure 4:
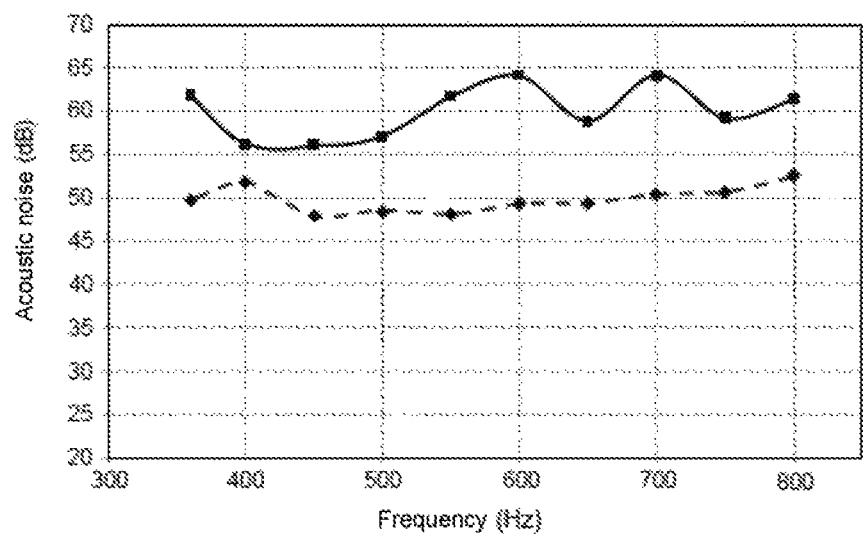

FIG. 4 shows the acoustic noise level emitted by an interphase inductor as a function of frequency for a prior-art interphase inductor (solid line) and for an interphase inductor according to the invention (dashed line). Depending on the electrical frequency, the proposed solution allows a reduction in acoustic noise level of between 5 dB and 15 dB.

Each winding 43, 53 is fastened to the branch B1 or B2 around which it is wound, and preferably to the magnetic circuit, only by means of the adhesive. This makes it possible to ensure the winding and the branch B1 or B2 are decoupled vis-à-vis acoustic vibrations. In contrast, this makes the winding more fragile with respect to handling of the interphase inductor. Moreover, the manufacture of the device is longer and more tedious than in the prior art.

Advantageously, the interphase inductor is devoid of the varnish or resin in which both the windings and the common magnetic circuit are embedded. This makes it possible to avoid losing the advantage obtained via the decoupling vis-a-vis acoustic vibrations, which is obtained with the adhesive, and to avoid potential deterioration of the adhesive via chemical reaction between the varnish and adhesive.

Advantageously, as shown in FIG. 2b, the blocks of supple material 46, 47, 56, 57 are placed solely in proximity to longitudinal ends of their branches B1 and B2. This position allows a good mechanical stability and easy access, with a view to applying the adhesive, to be achieved.

As a variant and/or in addition, at least one block of supple material is placed in proximity to the centre of a branch.

Each of the blocks 46, 47, 56, 57 encircles, for example, the corresponding branch B1 or B2 completely. This makes it possible to guarantee a spacing between the winding wound around the branch and the branch over the entire periphery of the branch.

The blocks 46, 47, or 56, 57 are, for example, spaced apart, along the longitudinal axes x1 and x2 of the branches B1 and B2, respectively. In other words, for example, the blocks 46 and 47 are spaced apart, along the longitudinal x1 of the first branch B1 and/or the blocks 56 and 57 are spaced apart, along the longitudinal x2 of the second branch B2. The magnetic circuit undergoes thermal losses that it is necessary to dissipate by convection (air is used to extract the heat). The adhesive is a thermal insulator and this spacing allows overheating of the magnetic circuit to be avoided. Moreover, it allows the stiffness of the joint between the magnetic circuit and the winding to be limited and therefore promotes the vibrational decoupling between these elements or pushes the cut-off frequency (frequency from which the decoupling becomes effective) toward high frequencies. In other words, the set of at least one block holding a winding away from the magnetic circuit at every point of the winding, comprises a plurality of blocks. The set of blocks comprises blocks which are distant from one another along the axis of the branch about which the winding is produced.

Figure 5:
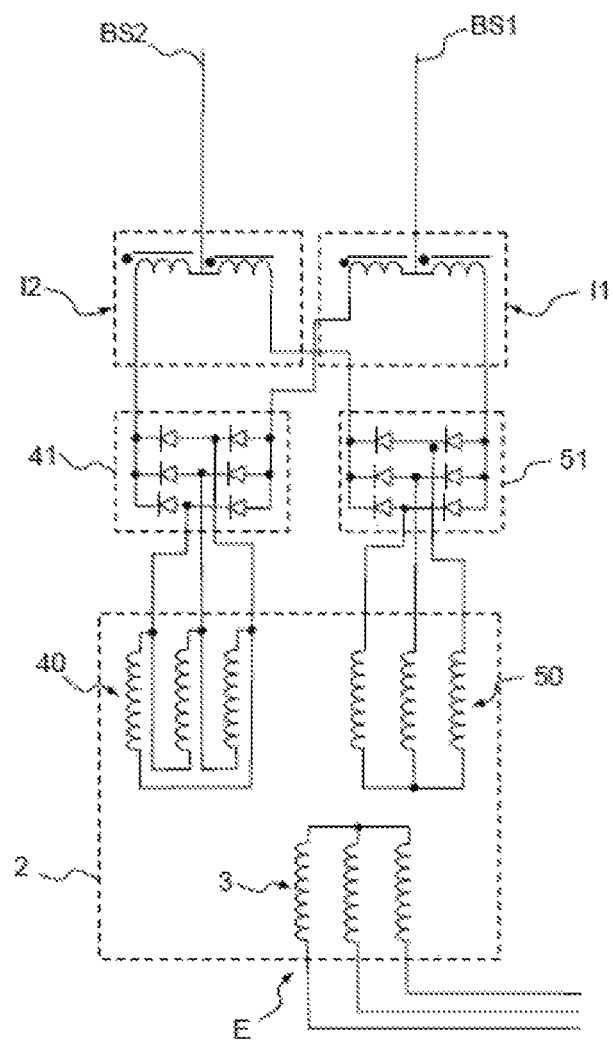

It will be noted that the invention encompasses a converter of the type shown in FIG. 5, in which converter each rectifier comprises a first output connected to a first output terminal BS1 via a first interphase inductor 11, this converter differing from the converter of FIG. 2 in that a second output of each rectifier is connected to the second output terminal BS2 via a second interphase inductor 12. Just like the inductor I, these inductors comprise a common magnetic circuit and two windings produced about two parallel longitudinal branches of the magnetic circuit so as to form two coils able to be mounted on the magnetic circuit as described above via the set of at least one block of a supple material.

The coils of the interphase inductors 11 and 12 are connected in series and a midpoint connecting these coils is connected to the corresponding output terminal BS1 or BS2.

The invention also relates to a process for manufacturing an AC/DC converter according to the invention.

Figure 6:
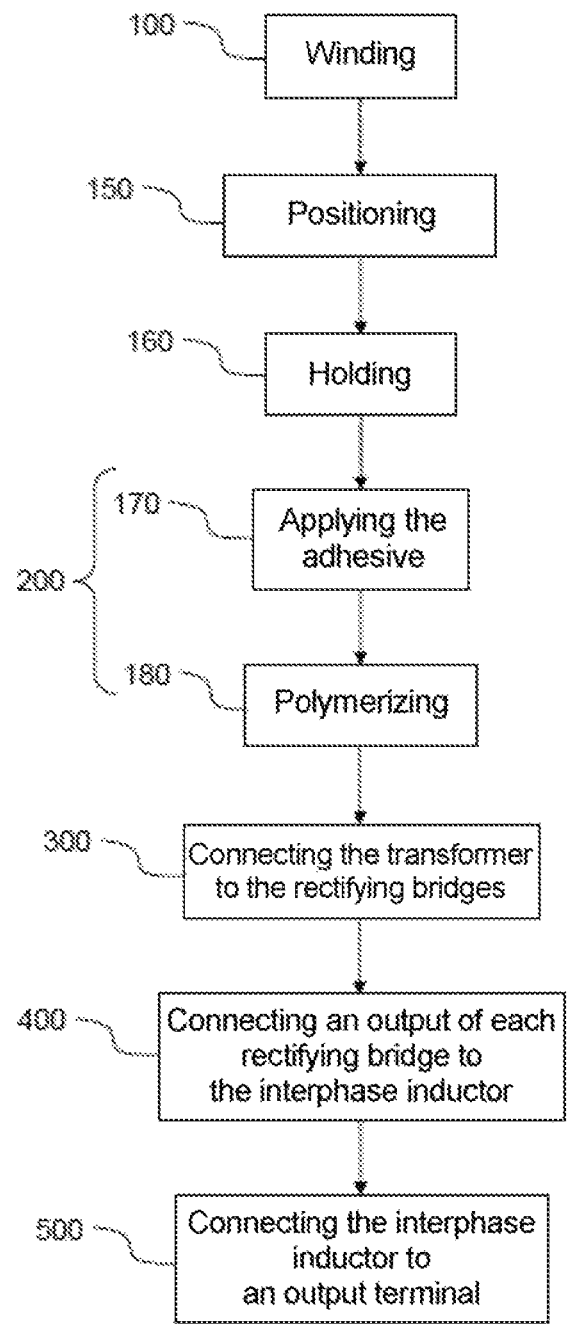

As shown in FIG. 6, the process comprises the following steps, for each winding:

a step 100 of winding a conductive element about the branch in order to form the winding so that the winding is able to be held away from the magnetic circuit at every point of the winding, and in particular from the branch about which it is wound, a step 200 of forming the set of at least one holding block fastened to the magnetic circuit, a step 150 of arranging the winding with respect to the magnetic circuit so that the set of at least one holding block holds the winding away from the magnetic circuit at every point of the winding.

The process also comprises the following steps:
  connecting 300 each secondary of the transformer to the input of one of the rectifying bridges, connecting 400 an output of each rectifier bridge to the interphase inductor, connecting 500 the interphase inductor to one of the output terminals of the converter.

Advantageously, the step consisting in connecting each output of each rectifying bridge to the interphase inductor consists in electrically and mechanically connecting the output of the rectifying bridge to the interphase inductor. This connection is advantageously achieved solely via one of the windings of the interphase inductor.

Advantageously, the step consisting in connecting the interphase inductor to one of the output terminals of the converter consists in electrically and mechanically converting the output terminal to the interphase inductor. This connection is advantageously achieved solely via the windings of the interphase inductor.

In the process shown in FIG. 6, the positioning step 150 is subsequent to the winding step 100.

The process comprises a step 160 of holding the winding with respect to the magnetic circuit in the relative position of step 150.

The positioning and holding steps are carried out using a tool.

The step 200 of forming the set of at least one block is subsequent to the positioning step 150. It is implemented while the winding and magnetic circuit are held in the relative position.

Advantageously, the set of at least one block fastens the winding to the magnetic circuit by adhesive bonding.

The steps of positioning and holding the windings with respect to the two parallel branches of the common magnetic circuit may be one and the same step.

Advantageously, the steps of forming the sets of blocks intended to hold the two windings are one and the same step.

Figure 7:
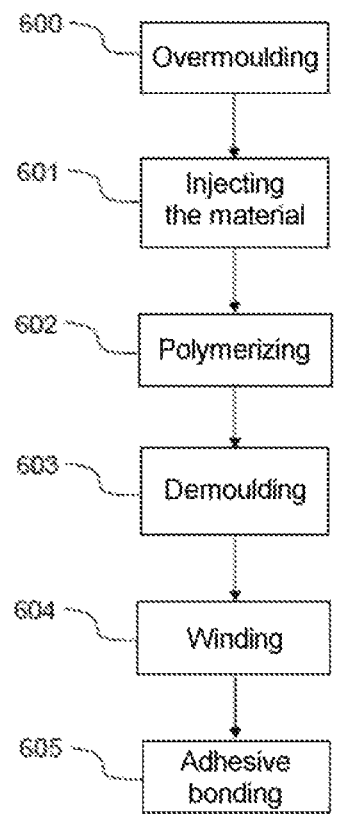
Figure 8:
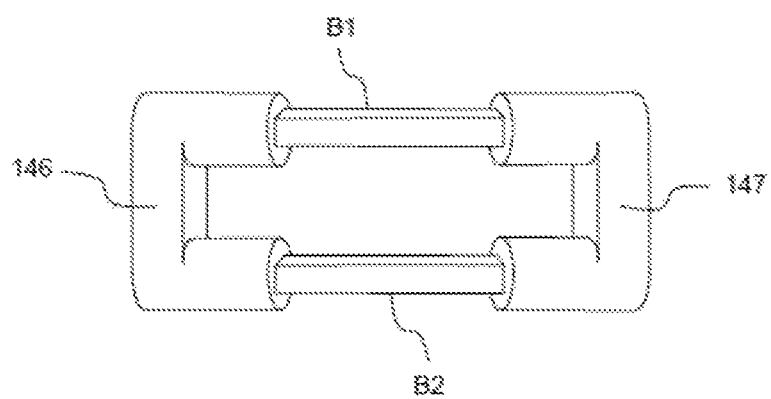
Figure 9:
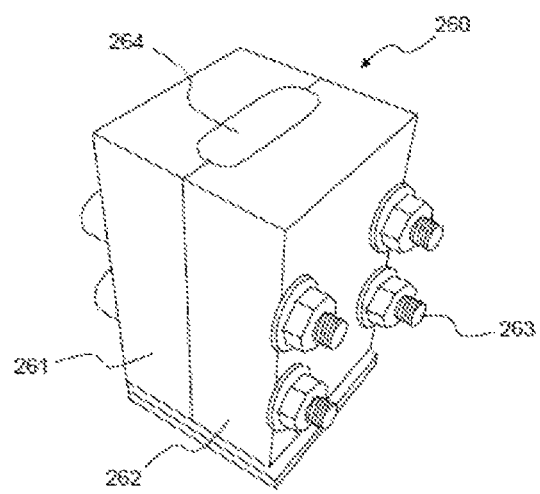

As a variant, the manufacturing process comprises the following steps, which are schematically shown in FIG. 7:

a step 600 of overmoulding the magnetic core 60 by means of a mould 260 shown in FIG. 9 encircling the magnetic core 60 and defining at least one free volume in which said at least one block of adhesive is intended to be found, a step 601 of injecting the material into the free volume, the material for example being an adhesive, an optional step of polymerizing the adhesive 602, an example of a magnetic circuit 60 equipped with blocks thus formed being shown in FIG. 8, a step of removing the mould 603 so as to demould the magnetic core equipped with said at least one block of adhesive, followed by the winding step 604 in order to form the winding about the branch so that the set of at least one holding block holds 605 the winding away from the magnetic circuit.

In this process, the step of forming the set of at least one block comprises the step of injecting the material and the optional polymerizing step.

This step is followed by the step of positioning the winding with respect the magnetic circuit so that the set of at least one block holds the winding away from the magnetic circuit at every point of the winding. This step is also the step of producing the winding.

Advantageously, the blocks are configured so as to hold the winding so that it is unable to be translated along the axis of the branch with respect to the magnetic circuit. They advantageously form stops for preventing a movement of the winding with respect to the magnetic circuit along the axis of the branch.

This process has the advantage of being more reproducible than the first process but takes longer to implement as the polymerization of the adhesive in the mould takes longer than the polymerization in open air.

As may be seen in FIG. 9, the mould 260 comprises two separable portions 261 and 262 that are fastened to each other by attaching means 263 so as to define the one or more free volumes intended to receive one or a number of blocks of supple material. The mould 160 comprises at least one aperture 264 via which the adhesive is intended to be injected into the mould. In the example of FIGS. 8 and 9, the mould comprises two apertures, only one of which is shown in FIG. 9. These apertures are located at longitudinal ends of the mould 260 so as to allow the two blocks of adhesive 146 and 147 to be formed at the longitudinal ends of the branches B1 and B2, as shown in FIG. 8.

The blocks 146 and 147 are spaced apart along the longitudinal axes of the branches B1 and B2, this meaning that the mould 260 defines two volumes that do not communicate with one another and which each open onto only one of the two apertures, the volumes being distant from each other along the longitudinal axes of the branches B1 and B2.

In the embodiment of FIG. 8, the magnetic circuit is equipped with two blocks of supple material 146 and 147. Each block of supple material 146, 147 completely encircles the two branches B1 and B2 so as to allow the two windings to be held away from the magnetic circuit and in particular from the branches. The windings are held thus when they bear against the blocks. The blocks 146 and 147 form radial stops allowing a radial movement of each winding along an axis radial to the longitudinal axis of its branch to be prevented.

Advantageously, the blocks of material are configured and arranged so as to hold the windings fixed with respect to the magnetic circuit along the longitudinal axes of the branches. Thus, the blocks 146 and 147 advantageously completely encircle the small branches B3 and B4 connecting the large branches together.

Advantageously, each block 146, 147 is placed at one of the ends of the branches B1 and B2.

The invention claimed is:

1. An AC/DC converter comprising an input of the AC/DC converter, said converter being intended to receive an input three-phase AC voltage and to convert it into a DC voltage, the AC/DC converter comprising a transformer intended to receive the input three-phase AC voltage and to deliver two output three-phase AC voltages via two respective secondaries, the AC/DC converter comprising a set of two rectifying bridges, each secondary being connected to the input of one of the two rectifying bridges of the set, each rectifying bridge of the set of rectifying bridges comprising a first output connected to an output terminal of the AC/DC converter by an interphase inductor, the interphase inductor comprising a magnetic circuit comprising two branches that are substantially parallel and two windings, each winding of the two windings being wound about one branch selected from the two branches and being held away from the magnetic circuit at every point of the winding, wherein each winding is fastened to the one branch selected from the two branches solely by a set of at least one holding block made of a material having an A-scale Shore hardness lower than or equal to 50.

2. The AC/DC converter according to claim 1, wherein the set of at least one block comprises a plurality of blocks spaced apart along a longitudinal axis along which the branch extends longitudinally.

3. The AC/DC converter according to claim 1, wherein the material is an adhesive.

4. The AC/DC converter according to claim 1, wherein the transformer comprises a primary that is intended to receive the input three-phase AC voltage.

5. A process for manufacturing an AC/DC converter according to claim 1, comprising, for each winding of the two windings:
- winding in order to form the winding about the branch so that the winding is able to be held away from the magnetic circuit at every point of the winding,
- forming the set of at least one holding block fastened to the magnetic circuit,
- fastening the winding to the one branch selected from the two branches solely by the set of at least one holding block made of a material having an A-scale Shore hardness lower than or equal to 50, such that the winding is held away from the magnetic circuit at every point of the winding.

6. The manufacturing process according to claim 5, wherein the material is an adhesive.

7. The manufacturing process according to claim 5, comprising positioning the winding and the magnetic circuit in a relative position wherein the winding is located away from the magnetic circuit at every point of the winding, followed by applying adhesive between the winding and the branch and a step of polymerizing the adhesive so as to form the set of at least one holding block.

8. The manufacturing process according to claim 5, comprising injecting the material into a mould that surrounds the magnetic circuit and that defines at least one free volume wherein the set of at least one holding block is intended to be located, injecting the material being followed by a step of removing the mould followed by the winding step.

* * * * *